United States Patent
Shuman et al.

(10) Patent No.: US 7,259,332 B2
(45) Date of Patent: *Aug. 21, 2007

(54) SEPARABLE MULTI-MEMBER COMPOSITE CABLE

(75) Inventors: Brian R. Shuman, Centerville, IN (US); Thomas L. Rodeghero, Richmond, IN (US)

(73) Assignee: Belden Technologies, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/459,773

(22) Filed: Jul. 25, 2006

(65) Prior Publication Data

US 2006/0254802 A1    Nov. 16, 2006

Related U.S. Application Data

(62) Division of application No. 11/082,646, filed on Mar. 17, 2005, which is a division of application No. 10/233,287, filed on Aug. 30, 2002, now Pat. No. 7,049,523.

(51) Int. Cl.
*H01B 11/00* (2006.01)
(52) U.S. Cl. .................................. 174/113 R
(58) Field of Classification Search ........... 174/113 R, 174/117 A, 113 C, 116; 385/101, 114
See application file for complete search history.

(56) References Cited

U.S. PATENT DOCUMENTS

| | | | |
|---|---|---|---|
| 3,458,650 A | 7/1969 | Miyawaki et al. | |
| 5,259,418 A | 11/1993 | Hamrick | |
| 5,327,513 A | 7/1994 | Nguyen | |
| 5,355,427 A | 10/1994 | Garies et al. | |
| 5,359,150 A | 10/1994 | Ikeuchi | |
| 5,401,908 A | 3/1995 | Rodeghero | |
| 5,574,250 A | 11/1996 | Hardie et al. | |
| 5,606,151 A | 2/1997 | Siekierka et al. | |
| 5,734,126 A | 3/1998 | Siekierka et al. | |
| 5,874,126 A | 2/1999 | Borket et al. | |
| 5,917,154 A | 6/1999 | Mortier | |

(Continued)

FOREIGN PATENT DOCUMENTS

DE    19628457    7/1996

(Continued)

OTHER PUBLICATIONS

Krone Product Catalog MK005-01.017 (undated), pp. 13-6 and 13-7.

(Continued)

*Primary Examiner*—Chau N. Nguyen
(74) *Attorney, Agent, or Firm*—Lewis, Rice & Fingersh, L.C.

(57) ABSTRACT

Multi-member cables which are comprised of two or more components (including component cables and non-cable components) held together by at least one adhesive element placed between the components, and methods for manufacturing such cables. Multi-member cables which are comprised of jacketed cables whose jackets are adhered together without the use of an adhesive element, such as by co-forming the jackets, and methods for manufacturing such cables are also discussed. Generally, the components will be separated from the multi-member cable by an installer, although other methods may also be used.

13 Claims, 9 Drawing Sheets

U.S. PATENT DOCUMENTS

| | | |
|---|---|---|
| 6,211,467 B1 | 4/2001 | Berelsman et al. |
| 6,222,129 B1 | 4/2001 | Siekierka et al. |
| 6,273,977 B1 | 8/2001 | Harden et al. |
| 6,297,455 B1 | 10/2001 | Wijnberg et al. |
| 6,318,061 B1 | 11/2001 | Schneider et al. |
| 7,049,523 B2 * | 5/2006 | Shuman et al. ......... 174/113 R |
| 2002/0121389 A1 | 8/2002 | Price et al. |
| 2002/0125036 A1 | 8/2002 | Price et al. |

FOREIGN PATENT DOCUMENTS

| | | |
|---|---|---|
| EP | 0802545 | 10/1997 |
| JP | 05250923 | 9/1993 |
| JP | 065127 | 1/1994 |
| JP | 11205993 | 7/1999 |

OTHER PUBLICATIONS

Belden, Inc. Catalog (1995) pp. 4.6, 5.19, 6.19, 6.23, 6.30, 6.33, 7.3, 9.3, 10.3, 10.9, 12.13, 12.63 and 12.65.

Belden Master Catalog (1995) pp. 181 and 183.

Information Sheet Entitled, "Belden Cable Preparation Tool," 2001.

Berk-Tek Product Selection Guide (undated), pp. 32 and 72.

* cited by examiner

SEPARABLE MULTI-MEMBER COMPOSITE CABLE

CROSS REFERENCE TO RELATED APPLICATION(S)

The application is a divisional of and claims priority to U.S. patent application Ser. No. 11/082,646 filed Mar. 17, 2005 and currently pending which is in turn a divisional of U.S. patent application Ser. No. 10/233,287 filed Aug. 30, 2002, Now U.S. Pat. No. 7,049,523. The entire disclosure of both documents is herein incorporated by reference.

BACKGROUND

1. Field of the Invention

This disclosure relates to the field of cables, particularly to multi-member composite cables where components are combined together in a single separable cable construct.

2. Description of the Related Art

In the modern world, cables are everywhere. They are used to transmit numerous signals between individual electronic components that can range from the very basic building blocks of electrical systems to the most cutting-edge consumer and commercial devices. As the world becomes more "wired" there is a growing need for the cables that carry signals to be more readily available and easier to install in both new and existing locations.

This is particularly true for cables used inside structures such as homes, other residences, or commercial establishments. Many of these structures do not have the necessary infrastructure to handle all the modern communication requirements. For instance, houses built many years ago generally do not have internal cabling for a local area network (LAN), and may or may not have broadband cable TV or modern phone lines installed. Further as the so-called "smart house" concept becomes more popular, there is a need for even more wiring that is not yet present in homes being built. In particular, many of the smart house applications require that multiple devices in a plurality of different locations be able to hook up to both internal networks and data connections, as well as external data lines and power.

Putting these types of cabling in older structures generally requires retrofitting and rewiring. In particular, the cables need to be installed through walls which are already in place. This can be a time consuming and physically difficult procedure as generally the resident and/or owner of the structure does not want walls, floors or other portions of the structure damaged to install the new cabling. To be able to do this, it is therefore desirable to have a single cable construct that allows for simultaneous installation of all the desired cables through the walls. In this way when the cable installer gets one of the cables to its predetermined termination point, the other cables (which are usually provided to a nearby termination point to be used by similar devices) are also already nearby.

The installation of this type of multi-member composite cable into already existing structures requires the installer to be able to maneuver the cable where it needs to go within the structure. In particular, when a cable is installed in a new structure the cable often does not need to be easy to bend or to turn as the cable can be bent as it is being installed. When installing new cable in an existing structure, a cable will often need to be flexible so as to be able to turn and will need to be "steerable" so as to be more easily installed through existing walls.

Even when cables are being installed in a new structure where the installer has much more access, there are significant advantages to having cables that can be installed together. In particular, the cables will usually terminate at points fairly close together as often a single device will use multiple hookups (for instance, a computer will generally need cables to supply power, a phone line, a LAN line, and possibly a broadband TV line). Further, as devices become more interconnected, even specialized devices are beginning to demand additional hookups (for instance a console arcade system and associated TV may require multiple hookups to different connections (such as, but not limited to, audio, control, telephone, power, and broadband cable TV and also LAN or other internal data hookups)). Even when devices only require a single hookup, there is generally a single point where an external hookup connects to the structure. Depending on the size of the structure, even if hookups are distributed in a room or in multiple rooms, having them go from the single input to the room or rooms together can be highly beneficial. Traditionally, each type of cable has been separate, therefore a cable installer would need to install a separate cable for each location.

The use of separate cables required the cable installer to carry multiple reels of different cables, and to repeatedly install the cables. Further, it required the cable installer to perform the same actions multiple times as they would install one cable and then install another cable in the same position. This increases the total amount of time it takes to wire a structure and is particularly problematic if the installation has points of particular difficulty as each additional cable may dramatically increase the total number of steps needed to get it installed correctly. For instance, if the installer needed to thread a cable through a small hole a significant distance away, the amount of time it takes for the installer to do it successfully once is generally significantly less than the amount of time it takes for the installer to perform the same action 5 or 6 times. This is particularly true if the already installed cable gets in the way of installing later cable.

To try and make the installer's job easier, there have been created some types of multi-member cables, where multiple different types of cable, such as coaxial cables and twisted pair cables are combined into a single multi-member cable by enclosing all the individual component cables in a single overall jacket which retains them all together. This arrangement allows the installation of a single multi-member cable through the structure. Once the multi-member cable is in the general location where an individual component cable is to be installed, the jacket can then be stripped and the individual components separated so that they can be installed to nearby terminators or panels.

While these overall jacketed cables help to solve the underlying problem of separately installing multiple cables, they also create new problems. Firstly, stripping the overall jacket is generally a fairly tedious operation and can require specialized tools (due to the large size and sometimes convoluted shape of the composite cable). Sometimes even with these tools, the cables can slip and move relative to each other inside the jacket causing further problems. Further, because removing the outer jacket involves cutting into the composite cable, a component cable can be damaged by this activity as cutting into the overall jacket can inadvertently lead to cutting into an underlying component cable. This may result in an internal component cable being unusable and the whole composite cable having to be replaced and reinstalled which is both time consuming and wasteful. Further, the outer overall jacket generally adds stiffness and increases the overall diameter of the cable. This can often make the cable difficult to maneuver into tight points or around corners and adds cost to the resultant product.

An additional problem with the overall jacketed composite cable is that the separation of the composite cable is an all or nothing procedure. Therefore, if the cable installer wants to install a single component cable from the composite at one point, and the remaining components at a point twenty feet away, the cable installer is generally forced to strip twenty feet of the overall jacket from the composite cable so as to access the internal component(s) needed, and then install the remaining twenty feet without the benefit of the overall jacket. This often defeats any benefit that would have been obtained from using the overall jacketed composite cable in the first place, and this premature forced separation can make installing the remaining components even more difficult as the component cables have to be installed simultaneously, while each moving and interacting separately.

Another type of multi-member cable is what is referred to as a bindered cable. This is generally of similar structure to an overall jacketed cable in that the component cables are held together by an external "wrap" or binder which encircles them. In a bindered cable, the wrap is not a jacket but is a narrow binding material that encircles the component cables. Generally these binders are ribbons of polyester or nylon wrapped in either concentric rings or a helical pattern about the component cables. Bindered cables suffer from many of the same problems as the overall jacketed cable and further can more easily be snagged on obstructions while the cable is being installed. Further, the bindered cable will often not meet industry cable performance specifications leading to multi-member cables of less than desirable quality.

SUMMARY

Because of these and other previously unknown problems in the art, disclosed herein are multi-member composite cables (or multi-member cables or composite cables as the terms are used interchangeably) which are comprised of two or more components, such as component cables and/or non-cable components, held together with at least one section of an adhesive element placed between the components, and methods for manufacturing such cables.

Also disclosed are multi-member composite cables which are comprised of jacketed component cables whose jackets are adhered together without the use of an adhesive element, such as by co-forming the jackets, and associated methods. These cables are all generally intended to be used by an installer who will install the multi-member cable to a predetermined point, where he or she will then separate at least one of the component cables and then install the separated component cable(s) to different points.

Described herein is an embodiment of a multi-member cable comprising: an adhesive element, a first component cable, and a second component cable, wherein the adhesive element is placed between the first component cable and the second component cable such that the first component cable is adhered to the adhesive element and the second component cable is also adhered to the adhesive element. The component cables may be jacketed and the adherence may be to the jackets. Any of the component cables may be voice or data cables, broadband coaxial cables, other coaxial cables, or optical fiber cables. The multi-member cable may also be twisted into a helix.

In an embodiment the adhesive element may comprise plastic such as, but not limited to, Polyvinyl chloride (PVC) and/or may adhere with about three pounds of force.

In an embodiment, the multi-member cable may further comprise a third component cable and/or a fourth component cable and/or a fifth component cable. The adhesive element may also be adhered to the third component cable, the fourth component cable, and/or the fifth component cable. In another embodiment, the multi-member cable may include a second adhesive element, the second adhesive element being adhered to the third component cable, the fourth component cable, and/or the fifth component cable. Each of the component cables may be jacketed and the adherence may be to the jacket.

In another embodiment, the multi-member cable may include a non-cable component, such as, but not limited to, a tube to which the adhesive element is also adhered.

In another embodiment, there is described a multi-member cable comprising: a first component cable, the first component cable having a jacket as its outer surface; a second component cable, the second component cable having a jacket as its outer surface; a third component cable, the third component cable having a jacket as its outer surface; and a fourth component cable, the fourth component cable having a jacket as its outer surface; wherein at least two of the first component cable jacket, the second component cable jacket, the third component cable jacket, and the fourth component cable jacket are co-formed. The cable may also include a fifth component cable whose jacket is co-formed with at least one of the above jackets and/or a non-cable component which may comprise a tube which is co-formed with at least one of the component cable jackets.

In another embodiment there may be further included an adhesive element adhered to any selected component cable jacket and at least one other component cable jacket. In another embodiment, the multi-member cable may include a non-cable component which in turn may comprise a tube which is co-formed with at least one of said component cable jackets.

In another embodiment, there is described a method of installing cable comprising: providing a multi-member cable including at least two component cables, installing the multi-member cable into a location, grasping a terminating end of the multi-member cable, and separating at least one of the component cables from at least one other of the component cables by breaking a bond between the component cables. The bond may be formed by an adhesive element adhered to both the component cables or by co-forming both the component cables.

In yet another embodiment, there is described a machine for constructing a multi-member cable comprising: a crosshead, the crosshead aligning at least two component cables relative to each other; an extrusion die, the extrusion die extruding an adhesive element, such as, but not limited to, a plastic such as polyvinyl chloride (PVC) between the aligned component cables; and a closing device, the closing device forming the component cables into the adhesive element so that the adhesive element adheres to the component cables.

In still another embodiment, there is described a method for constructing a multi-member cable comprising: providing at least two previously assembled component cables, placing the component cables in proximity to each other, providing an adhesive element between the component cables, passing the component cables through a forming device which presses the component cables into the adhesive element; and solidifying the adhesive element.

In still another embodiment, there is described a method for constructing a multi-member cable comprising: providing at least four component cables, jacketing the component cables at a substantially simultaneous time, such as by passing the component cables through a singular extrusion die with multiple exit points, placing the cables in proximity to each other, passing the component cables through a forming device which causes the jacketing on the component cables to co-form, and solidifying the jacketing, such as by cooling the jacketing.

In still another embodiment, there is described a multi-member cable comprising: an adhesive element, a component cable, and a non-cable component, wherein the adhesive element is placed between the component cable and the non-cable component such that the component cable is adhered to the adhesive element and the non-cable component is adhered to the adhesive element.

DETAILED DESCRIPTION OF PREFERRED EMBODIMENT(S)

Figure 1A:
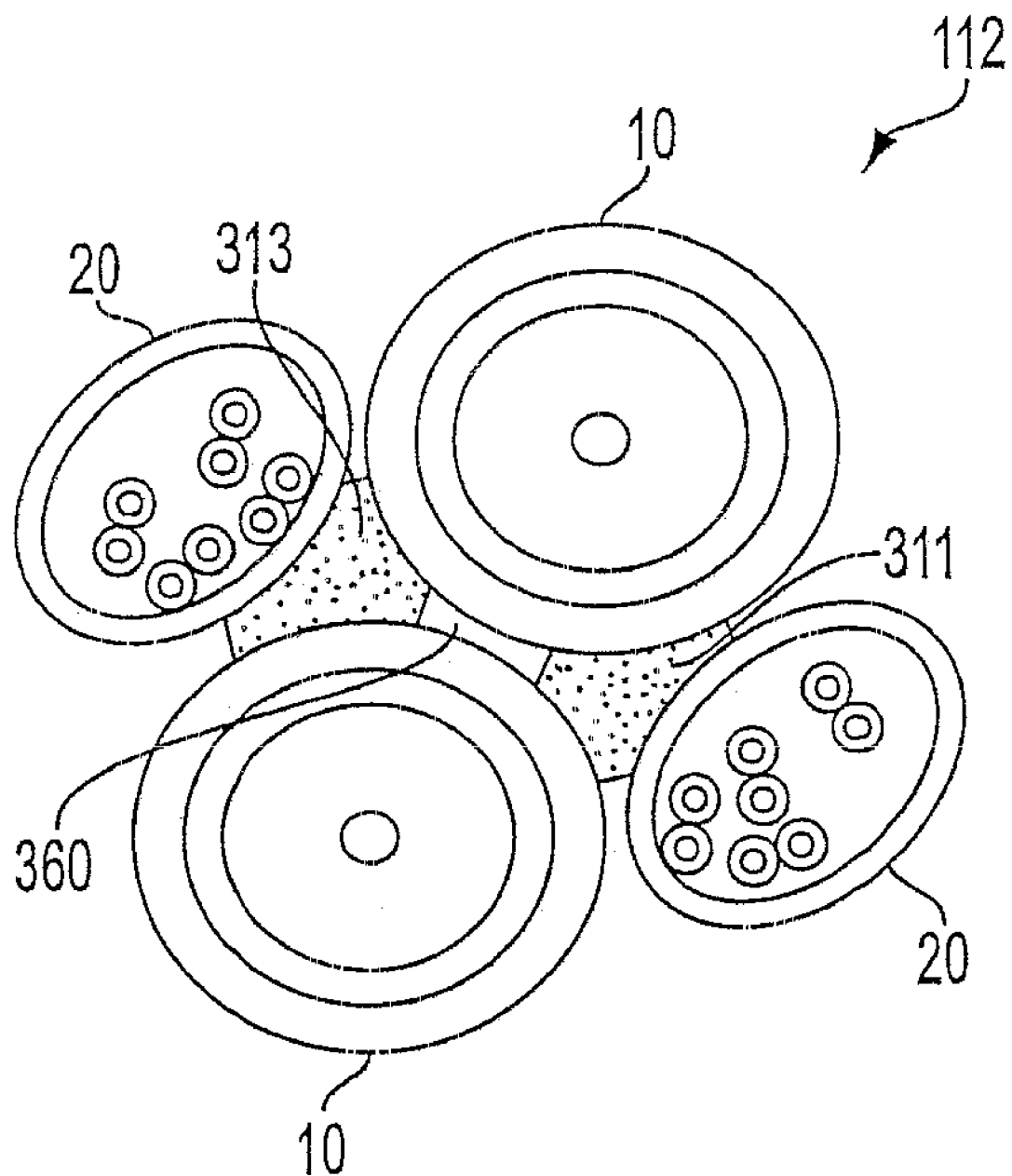
FIG. 1 depicts three embodiments (FIGS. 1A, 1B, and 1C) of multi-member composite cables utilizing an adhesive element construction and having four component cables.

Although the cables and methods described below are discussed primarily in terms of their application to the installation of multi-member cables in structures, multi-member cables can be used anywhere that component cable(s) making up the composite are desired. In particular, the composite cables can essentially be used anywhere where at least one of the component cables making up the composite cable is desired. Further, while the multi-member composite cables discussed herein are primarily made from coaxial cables and twisted pair voice or data cables (or CATEGORY cables), a multi-member cable could be manufactured from any combination of component cables such as, but not limited to, power cables, data cables, voice cables, voice or data cables, control cables, low voltage power limited cables, paired cables, twisted pair cables, multi-conductor cables, multi-pair cables, armored cables, audio cables, fiber optic cables, coaxial cables, triaxial cables, twinaxial cables, or any combination thereof. Further, a composite multi-member cable could also include strength or load-bearing members, fillers, tubes, hoses, liquid absorption products, or other non-cable components which are not cables, but are desired to be included in the composite multi-member cable. Further, the component cables which make up the multi-member cable will generally be insulated or "jacketed" as understood by one of ordinary skill in the art. That is, an uninsulated conductor or a cable with uninsulated conductor(s) as its outer surface will generally not be used as that component will typically be encased in an insulative cover or "jacket." One of skill in the art, however, would understand that alternative embodiments could utilize bare conductor(s), strength or load-bearing members, surface conductors, and/or cables of any type or any type of non-cable component therein.

For purposes of clarification, certain terms will be used herein to generally refer to particular things. Firstly, the term cable will be used to generally represent any cable, wire, cord, conductor, optical fiber, or similar object that is generally used to transport electrical impulses or signals, light, or other signals regardless of type. Any cable can comprise one or more component cables and may also include any number of non-cable components therewith. The term multi-member composite cable (or multi-member cable or composite cable as the terms are used interchangeably throughout this disclosure) will generally refer to the subset of cables, formed of at least two component cables. A multi-member cable may also include any number of non-cable components therewith. That is, a multi-member cable is a composite cable formed from other cables, called component cables and/or non-cable components (either of these is occasionally referred to simply as a "component"). A multi-member composite cable can therefore comprise two or more cables, which can each in turn comprise any number of cables and so on. For example, two multi-member composite cables can be formed together into another multi-member composite cable. These definitions and any others within this disclosure are intended for general clarification only and should in no way be used to limit the meaning of any term herein as understood by one of ordinary skill in the art.

Figure 1B:
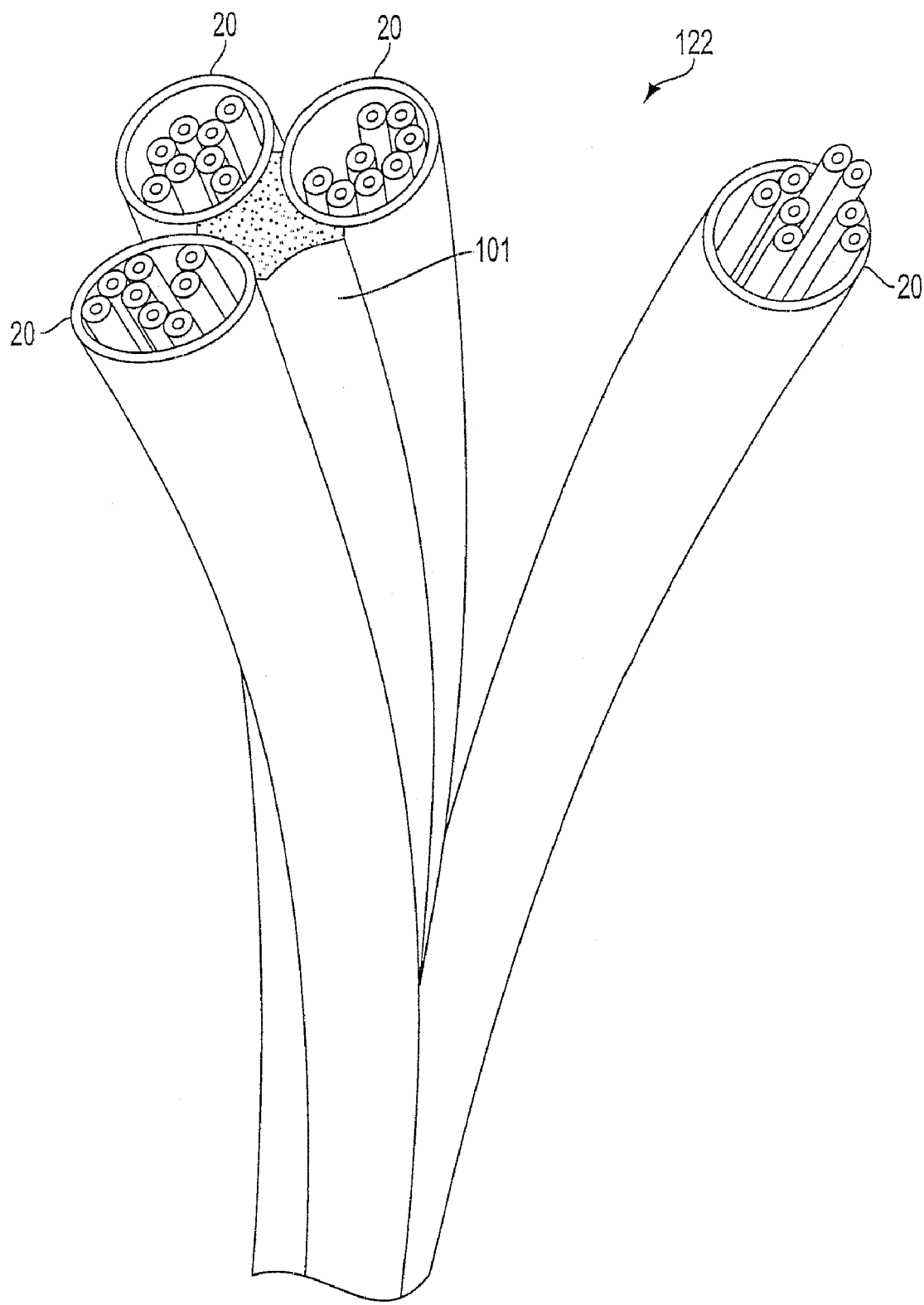
Figure 1C:
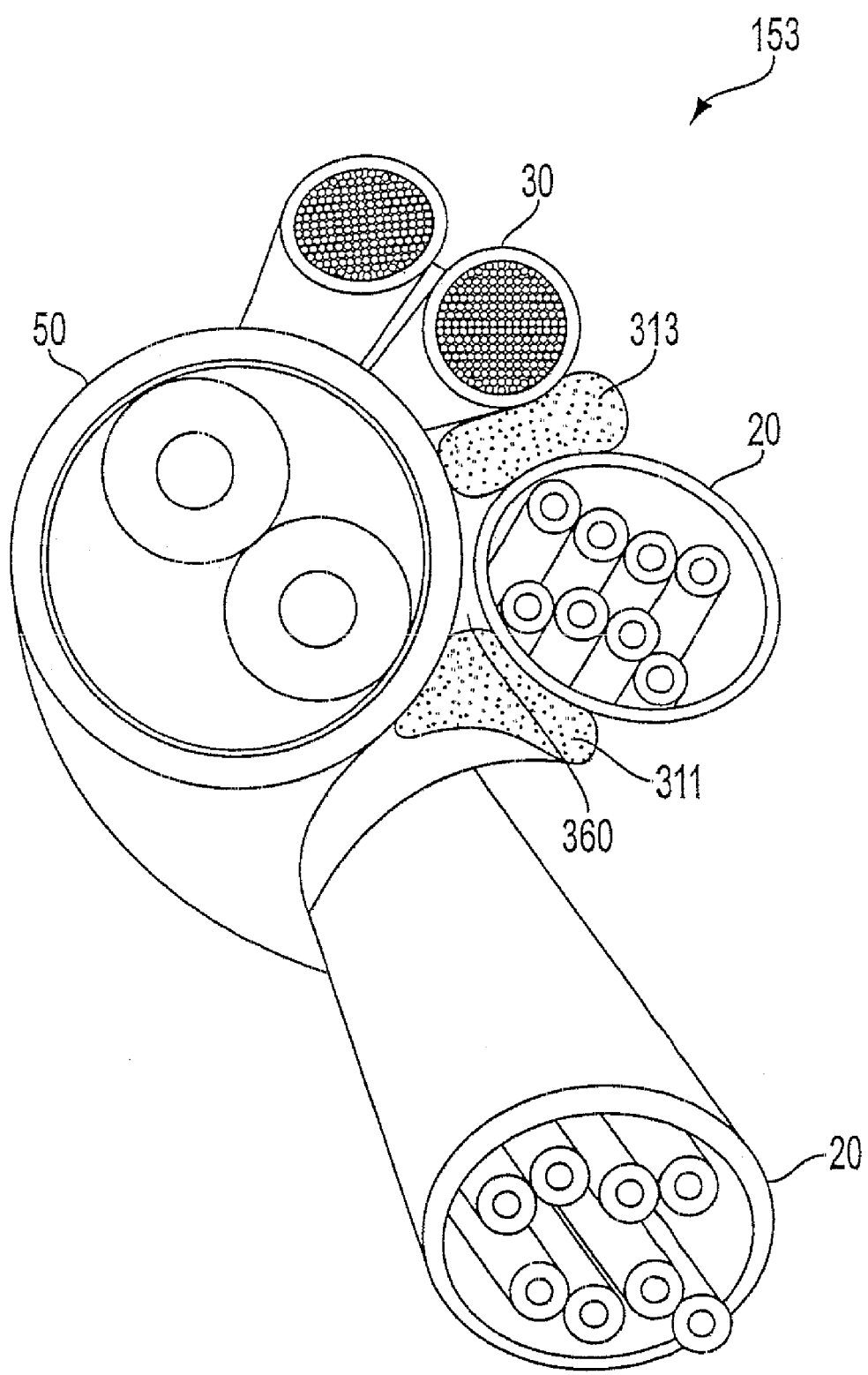
Figure 2A:
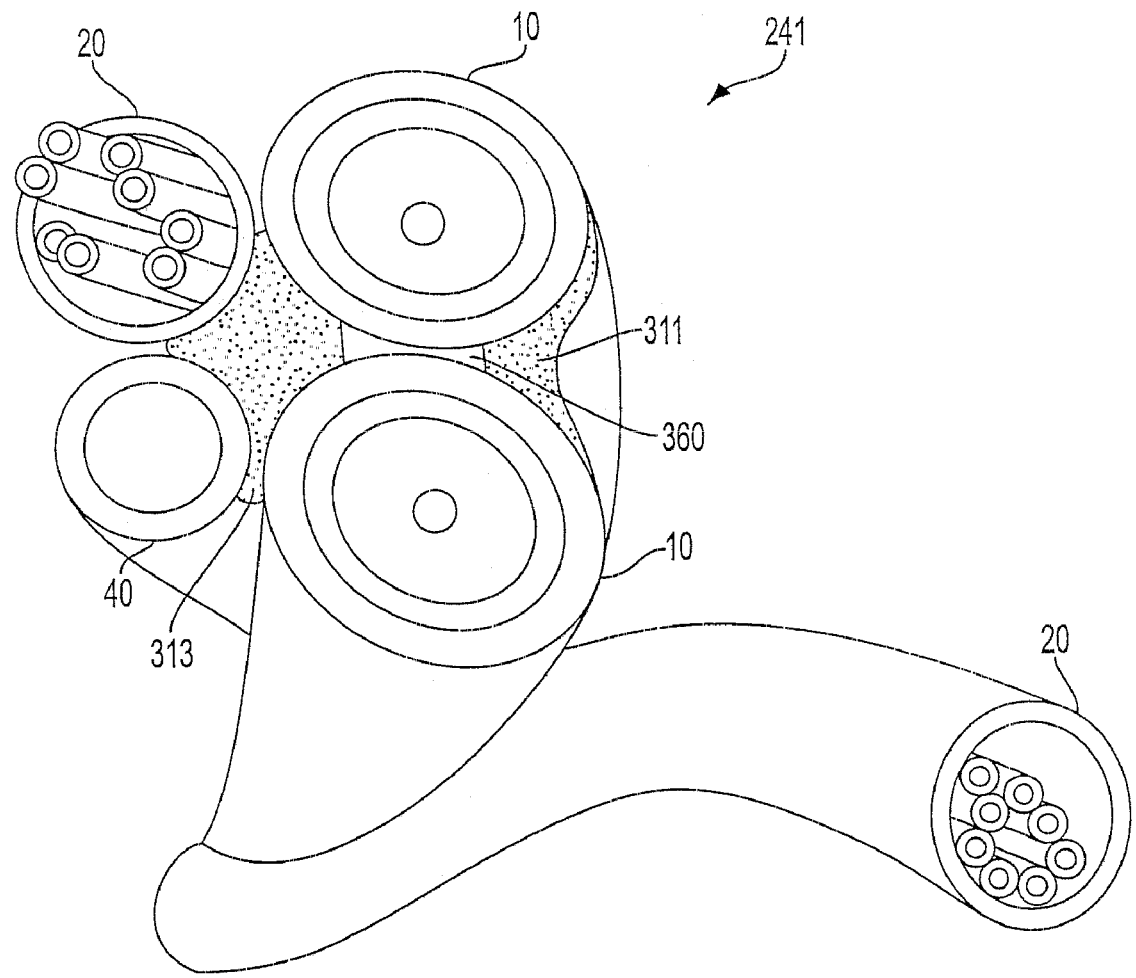
FIG. 2 provides two different views (FIGS. 2A and 2B) of another embodiment of a multi-member composite cable utilizing an adhesive element construction and having five component cables.
Figure 2B:
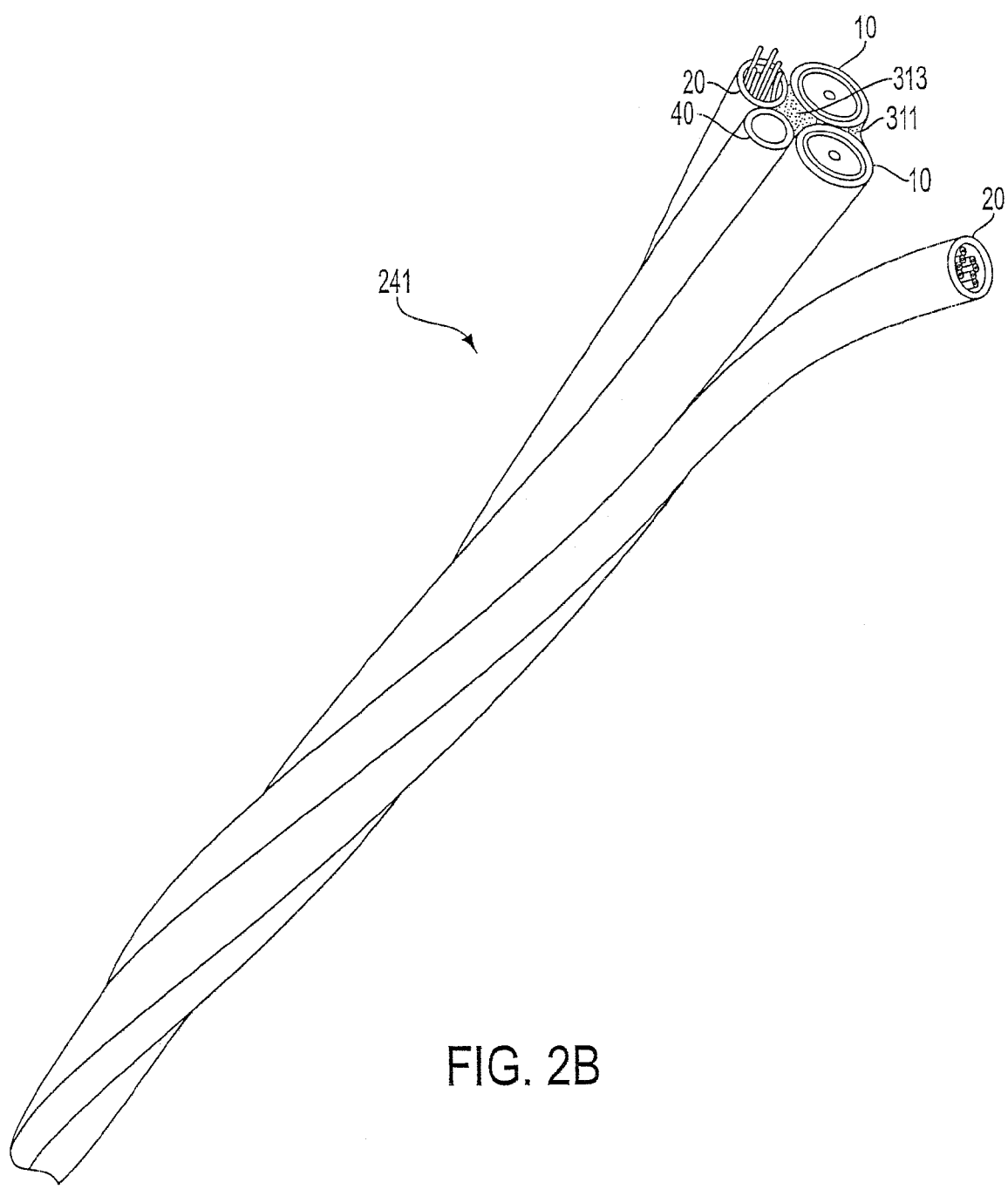

FIGS. 1 and 2 depict multiple embodiments of multi-member cables in accordance with the present invention. In FIG. 1 there are depicted multiple embodiments of multi-member cables having four component cables while in FIG. 2 there is an embodiment of a multi-member cable with five component cables. In the embodiments of FIGS. 1 and 2, the component cables generally comprise jacketed coaxial cables (10), voice or data cables (20), audio cables (30), optical fiber cables (40) twinaxial cables (50), or combinations of these types of component cables, but any other components may be used, including alternative component cables and/or non-cable components. In particular, FIG. 1A shows a multi-member cable (112) including two voice or data cables (20) and two broadband coaxial cables (10). FIG. 1B shows a multi-member cable (122) including four voice or data cables (20). FIG. 1C shows a multi-member cable (153) including two voice or data cables (20), a twinaxial cable (50) and an audio cable (30). FIGS. 2A and 2B show a multi-member cable (241) including an optical fiber cable (40), two voice or data cables (20), and two broadband coaxial cables (10). The combinations shown are in no way intended to be exhaustive of the multi-member cables which can be formed using these component cables or even exhaustive of the types of component cables or non-cable components which may be used in any particular multi-member composite cable.

In each of the depicted embodiments, the components are held together in a predetermined arrangement using at least one adhesive element (101), (311), and/or (313) regardless of which types of component cable(s) or non-cable components are used. In the simplest case, there is a singular adhesive element (101) which connects all the components (as in FIG. 1B). However, in another embodiment, there can be multiple adhesive elements (such as adhesive elements (311) and (313)) used in a single cable. All of these adhesive elements (101), (311), and (313) are generally comprised of a material that has a certain minimum adherence to the jackets, or other outer surfaces, of the component cables and to any non-cable components. As shown in the embodiments of FIG. 1, the adhesive elements will generally be placed inside the area defined by the components being therefore generally between them. The adhesive elements will generally not be on the outer surfaces of the composite cable, but enclosed within the composite cable. For the purpose of this disclosure, any reference to adhesive element (101) could also refer to any other adhesive element (311) and/or (313) and vice-versa as all the adhesive elements (101), (311), and (313) can be of essentially the same material construction. Their placement in the resultant multi-member cable is the only difference between them. Further, any reference to a component cable could just as easily refer to a non-cable component Use of a multi-member cable such as those shown in FIGS. 1 and 2 will generally occur as follows. An installer will take the multi-member cable and install it in the desired location inside a structure and to the general termination points of the components. The installer will then grasp the terminating end of the multi-member cable and separate at least one component cable from the multi-member cable (as partially shown in FIG. 1B) by exercising a force to separate the component cable(s) from the adhesive affect of the adhesive element or adhesive properties of the jackets (as discussed below in conjunction with FIG. 3). The installer will then direct the component cable(s) to the desired destination point and attach an appropriate terminator. The installer will then repeat the separating, directing and termination steps until all the component cables are correctly installed to their destination points.

An adhesive element may comprise any of a plurality of materials as would be known to one of ordinary skill in the art. The only requirement of any adhesive element is that it adhere to another substance. It is preferable that the material of an adhesive element bond with the material of the component cable(s) (or other components) with sufficient strength to prevent unintended separation when the multi-member cable is coiled or otherwise manipulated. At the same time, the bond is also preferably sufficiently weak to be readily hand-separable or separable through the use of hand tools without danger of damage to the component cable(s) or other non-cable component(s). In particular, if an adhesive element bonds too strongly, a component cable jacket may be torn, or a non-cable component may be damaged when an installer attempts to separate the components. Generally, the adhesive element will be applied to a particular surface of the component interior to the resulting composite cable as shown in the FIGS. One of ordinary skill in the art would understand that stronger or weaker adhesive forces with corresponding changes in adhesive element surface area would clearly be equivalent. It has been found that an adhesive element requiring about three pounds of force to separate from a component is preferable to meet the above qualifications for ease of use and sufficient strength.

It is further preferable, but by no means required, that the adhesive element (101) have flame retardancy qualities sufficient to meet accepted industry standards and/or guidelines when applicable. It is also preferable that the material used have a relatively quick drying (solidifying) time so that it can be solidified in the normal course of manufacture. Otherwise the multi-member cable manufacture may require undue time constraints to build, or may become damaged if it is spooled or stored before the adhesive element (101) is completely solidified. Along with this, it is also preferable that the adhesive element (101) remain in its solidified state under normal conditions in which the composite cable will be used or stored to prevent the composite cable from separating or becoming damaged after manufacture.

In an embodiment, the adhesive element (101) may comprise a formulated chemical adhesive or glue as is known to those of ordinary skill in the art. These can include, but are not limited to, glues, caulks, or other adhesive substances. Generally these substances will begin in a partially liquid (e.g. gel or paste), liquid, or otherwise malleable or alterable form and will solidify through chemical interaction, heating, drying (evaporation of an ingredient), or other process or processes to an at least partially rigid steady state. It is preferred that the rigid state still maintain some flexibility. Those of ordinary skill in the art would be able to readily identify numerous such materials.

In another embodiment, the adhesive element may be a more general material which can be placed in a liquid, molten, or partially solid state through the application of heat and/or pressure, where it becomes sticky and then solidifies as it is allowed to cool to room temperature. Once at room temperature, the material will preferably solidify in a manner that will bind it to neighboring substances that it had been placed in contact with. In some embodiments, materials such as, but not limited to, plastics, biomatters, vinyl, glass, rubbers and even some metals may be used. Plastics, and particularly polyvinyl chlorides (PVCs), are most preferable because they generally solidify to a structure that is still quite flexible and are not brittle or overly rigid. PVC is most preferable because it generally meets accepted industry flame retardancy standards and guidelines, and will generally adhere to materials used in cable jackets with about three pounds of force. One of ordinary skill in the art would also recognize that any combination of materials could be used as different adhesive elements (311)/(313) in the same cable or combined together as a single adhesive element (101).

The embodiments of FIGS. 1C and 2 provide that the cables need not be symmetrically arranged. Further, in some of the depicted embodiments, the adhesive element (101) is replaced by other adhesive elements (313) and/or (311) separated from each other by a separation (such as separation (360)) which places air space between the components. The adhesive elements (311) and (313) are each in contact with only some of the component cables and may bind a subset of the component cables together. In an embodiment, this type of arrangement is used because it can allow for easier placement of the adhesive element within the cable arrangement. In particular, there essentially may be multiple points of binding the cables together which effectively forms subsets of cable. This can mean that cables can be combined into multi-member cables, with those multi-member cables then combined together to form larger multi-member cables without having to use excessive adhesive elements or form the final multi-member cable in a singular step.

A further advantage of the use of subsets is that certain groups of cables can be sub-bundled. For example, a single multi-member cable could include two of each type of cable (as shown in multi-member cable (112) in FIG. 1A). The installer could install the multi-member cable (112) into the structure where both subsets are to be installed, once a particular point where the cables were to be split was reached, the installer could separate the two subsets using adhesive element (311) to hold one subset together and adhesive element (313) to hold the other. Therefore, each adhesive element corresponds to a single installation subset and allows placement of the subset, without separating the two component cables for the particular subset (one broadband coaxial and one voice or data) from each other. The installer could then install each subset as a single cable even when the subsets were directed to different locations. The benefit of such an arrangement should be readily apparent as often cable subsets go to similar locations even if the total multi-member composite cable is split and maintaining the connection of the subsets preserves some of the benefits of forming the original multi-member cable.

One of ordinary skill in the art would understand that exact placement of the adhesive element within any given multi-member cable requires a significant number of design choices including the intended use of the resultant multi-member cable. In an embodiment, the adhesive element can be continuous (e.g. unbroken) so as to form a constant area of connection down the entire length of the cable for the various adhesive element portions (or single adhesive element). In an alternative embodiment, an adhesive element can be intermittent forming smaller patches or "blobs" of adhesive element through the length of the cable. This arrangement may serve to make the resultant cable more flexible or could be used to produce the cable at a lower cost, or to allow the portions of the adhesive element where the cables are separated to be easily removed and discarded when the cable is installed.

In another embodiment, the adhesive element could have a predefined shape which it may or may not maintain. For instance, the adhesive element may generally be arranged to have a particular polygon in cross section. This may be used to maintain the relationship of the component cables to one another. For instance, the polygon could be an "X" shape to maintain physical separation between four component cables from each other. In still another embodiment, the shape could be predetermined when the adhesive element is formed, but it could be deformed by the components.

While in the embodiments of FIGS. 1 and 2 only an instant or small portion of any multi-member cable has been shown, one of ordinary skill in the art would understand that the multi-member cable may include variations over its length. As discussed above, this variation may be the existence or non-existence of the adhesive element at a particular point along the length. In another embodiment, the multi-member cable may be formed with component cables which twist or bend over their length. For instance, each component cable may trace a helical path about the multi-member cable as shown in FIG. 2B. It is preferred that the multi-member cable have a helical twist because it provides for strain relief when the multi-member cable is coiled or otherwise bent and may also provide for various aesthetic benefits to the resultant cable.

Figure 3:
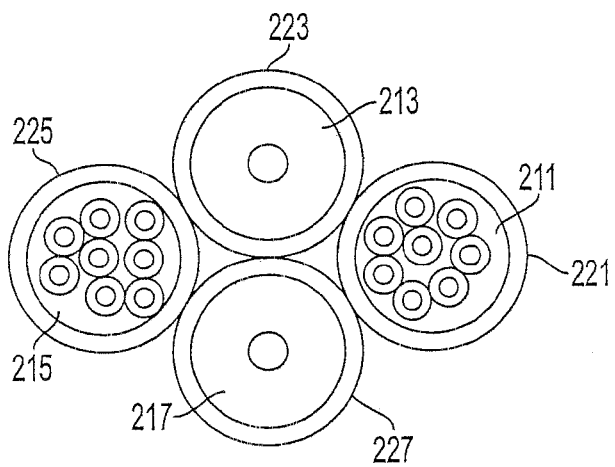
FIG. 3 depicts another embodiment of a multi-member cable without an adhesive element and having four jacketed component cables.

FIG. 3 provides for an alternative embodiment of a multi-member cable. In FIG. 3 there is no adhesive element used in multi-member cable (201). Instead the outer jackets (221), (223), (225) and (227) of the component cables (211), (213), (215) and (217) are heat formed together or "co-formed". In particular, the jacket material of most cables is suitable for use as an adhesive element. In the embodiment of FIG. 3, instead of adding the adhesive element, the jacket material is melted (heat treated) to soften it. The cables may then be formed together and while they are so interacting, create a bond between the cables generally internal to the resulting composite cable. This can be thought of as essentially performing the same activity as in the embodiments of FIGS. 1 and 2, however, the adhesive element is essentially formed by melting or otherwise altering the jackets of the component cables; it is not separately added. Since the material of the jacket may be used as an adhesive element, the result in the embodiment of FIG. 3 is essentially the same as the result in FIG. 1, simply with generally less of the material used. One of ordinary skill in the art would recognize that co-forming could also be used to combine component cables with other non-cable components. For instance, the component cable jacket could be co-formed with a tube formed of jacket material which later has structures (such as optical fibers) placed therethrough. In other embodiments still other non-cable components could be used.

The embodiments of FIGS. 1 and 2 are generally preferred to the embodiment of FIG. 3. The embodiments of FIGS. 1 and 2 will generally decrease the possibility of "gaps" or spaces being formed in the component cable jackets during the connection process. Further, the adhesive element can have different properties than the jacket if separately chosen. In FIG. 3, there is also the possibility of the component cable core properties being changed through the heat forming process. In particular, by melting the jacket surrounding the component cable, the cables, wires, and/or shields internal to that component cable may move relative to the jacket. In particular, in certain types of cable it is highly desirable that the core be centered within the jacket. If the jacket is altered (such as by melting, pressing, or other process) the core may no longer be centered which could decrease the electrical performance of the cable. The co-forming can also result in a bond which is of equivalent strength to the jacket itself (for instance when both cables use the same jacketing material). This bond is essentially just reforming the shape of the jacket to include both cables. When the cables are separated it is therefore likely that the cables will not separate in as clearly defined a location as when a different adhesive element is placed between the component cables. In particular, the jacket may tear. If the joint is the point that is the weakest, this may be a suitable design, but if the design leads to weaknesses elsewhere in the jacket, the attempt to separate the cables may damage them.

Figure 4A:
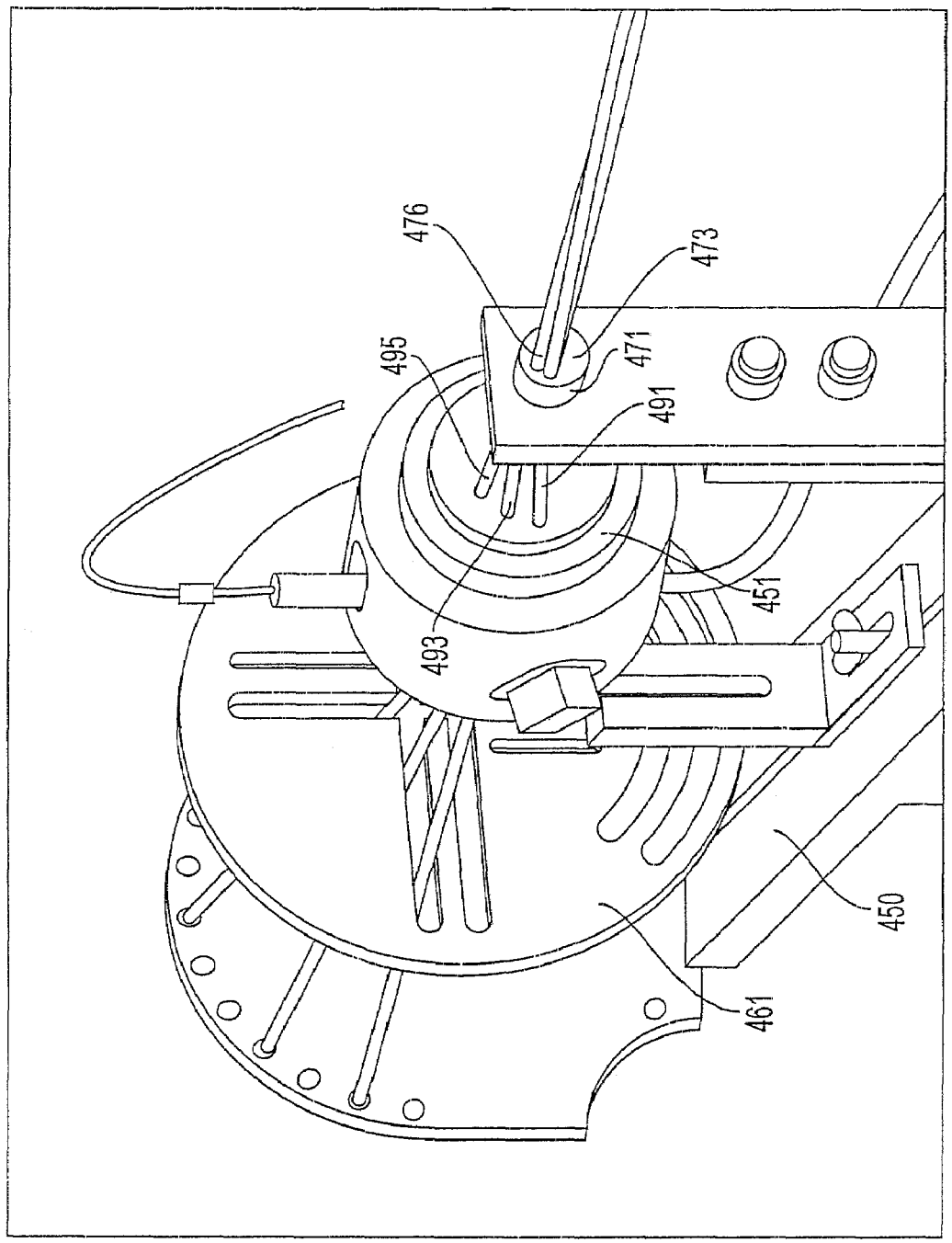
FIGS. 4A and 4B show general views of the machine while FIG. 4C provides a magnified view of the crosshead, extrusion die, and closing die.
Figure 4B:
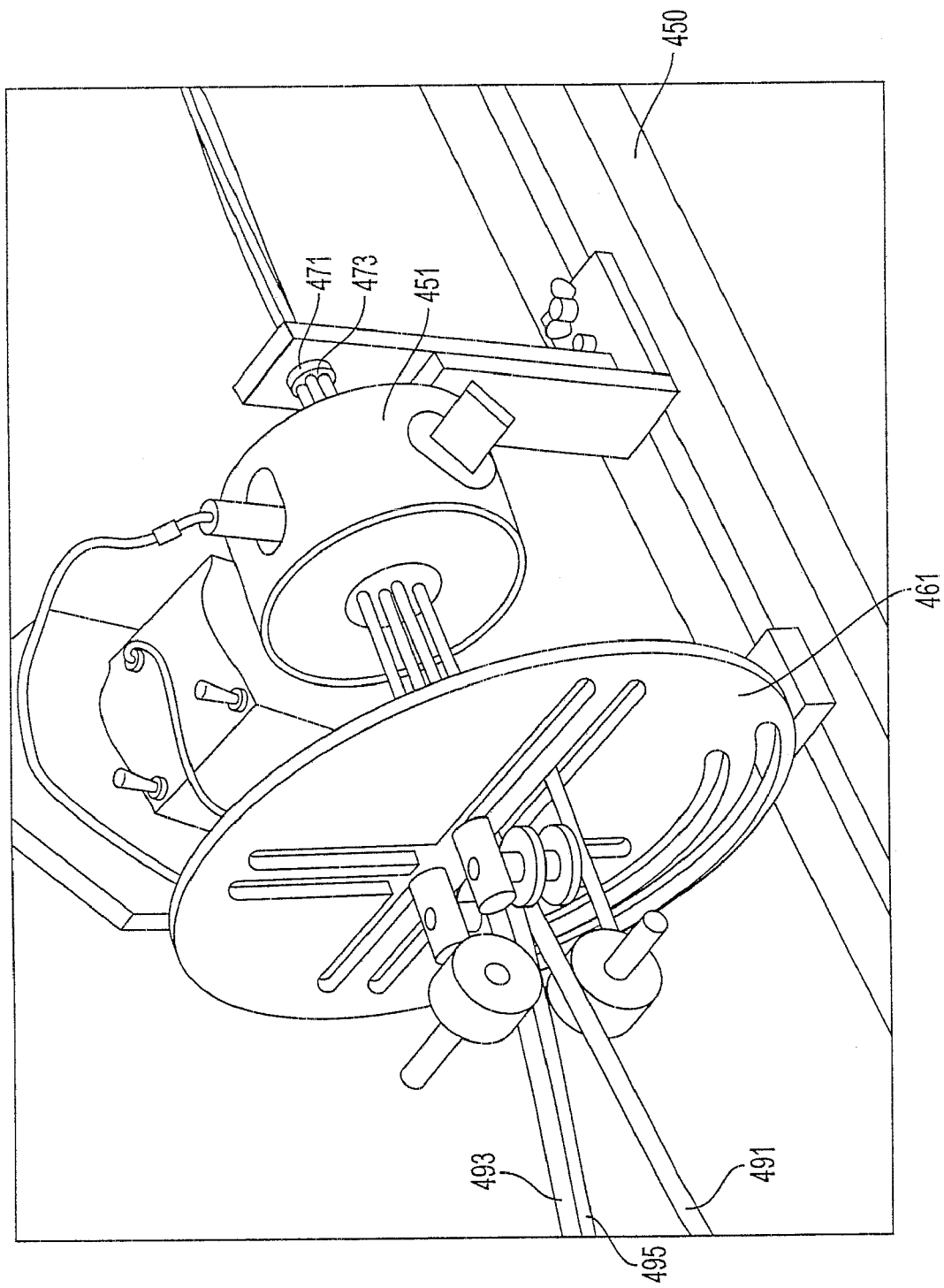
Figure 4C:
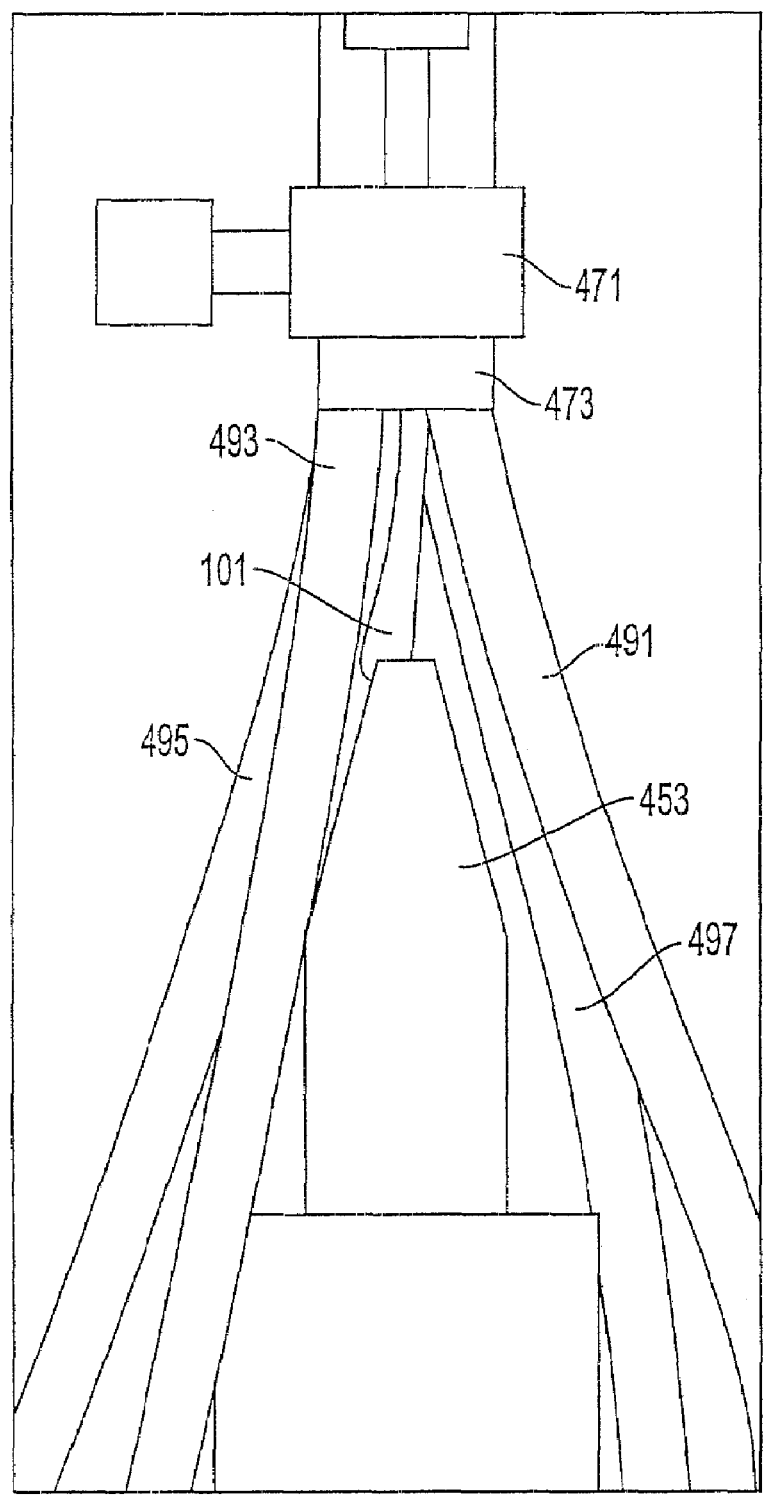
FIG. 4 shows multiple views of an embodiment of a machine for forming a multi-member cable by injecting an adhesive element between the components as shown in FIGS. 1 and 2.

FIGS. 4A, 4B, and 4C provide different views of a machine which may be used to manufacture a multi-member cable. In particular, this machine is designed to manufacture multi-member cable with an adhesive element such as the embodiments of FIGS. 1 and/or 2. The system (450) generally includes a crosshead (451) with an associated extrusion die (453). Generally the crosshead (451) and extrusion die (453) will be integrated and the combination mounted between the cabling guide plate (461) and the cabling machine (cabler (not shown)). The cabling guide plate (461) and cabler (not shown) are of the type generally known to those of ordinary skill in the art. The crosshead (451) generally is designed to ensure that cables (491), (493), (495), and (497) or any non-cable components are properly aligned relative to each other as the components approach the extrusion die (453). The extrusion die (453) is designed to extrude a stream or other source of adhesive material. In the preferred embodiment the crosshead (451) is actually part of an extruder for plastics that also include various associated apparatus such as a hopper for storing raw plastic pellets, a feeder for feeding the raw plastic into the system, and a device for heating the plastic to the molten state that is then extruded. In an alternative embodiment, any type of adhesive may be extruded through extrusion die (453) and the extrusion die (453) can be thought of as being a tip to a glue container or similar device. One of ordinary skill in the art would understand that the shape of the extrusion die (453) will determine the shape of the adhesive element when it is extruded. While some adhesives will not maintain this shape (as they are too runny or thin), in some embodiments, including those where PVC plastic is used, the adhesive element can maintain the shape it is extruded in when not exposed to external forces.

It is generally preferred that a PVC adhesive element be extruded and then compressed by the cables (491), (493), (495), and (497) into a shape which fills the void between the cables as shown in FIG. 1B. This compression is accomplished by closing die (471). Closing die (471) is generally a rigid piece of material with an opening (473) that is designed to constrain the components passing through it into a particular arrangement. In the depicted embodiment, the shape is generally constrained to align the cables (491), (493), (495), and (497) as shown in FIG. 1. The opening (473) may include, but is not limited to, rollers, ball bearings, or other surfaces (476) which are designed to apply pressure to the multi-member composite cables as they pass through. Generally, the opening (473) will be sized so as to require the cables (491), (493), (495), and (497) to pass therethrough in close proximity to each other. In particular, it is usually designed so that each of the component cables will be brought into contact with the adhesive element that has been extruded between them. To produce cables with more than one adhesive element section, additional dies can be included in tandem or in series with extrusion die (453). Alternatively, independent devices could be used to form the subsets of multi-member cables, which are then combined using a similar process to that described.

In a preferred embodiment the machine operates generally as follows. Component cables or other non-cable components that have been previously produced are fed from spools into the cabling guide plate (461) which aligns them and makes sure they are positioned correctly relative to each other. The components are then routed from the guide plate (461) into the extrusion crosshead (451) in a generally converging pattern. The extrusion crosshead (451) further serves to align the components with the extruded adhesive element (101) that is extruded inside the converging arrangement of components. Generally, this adhesive element (101) will be molten PVC and will be extruded from the extrusion die (453). The components and extruded adhesive element are then fed into a closing die (471) where the components are brought into contact with the adhesive element (101) (and possibly each other), in a manner which creates surface contact between the adhesive element (101) and the components. Further, the closing die (471) generally imparts a particular shape to the arrangement of component cables (491), (493), (495), and (497) and/or other components as they pass therethrough. The components are generally pulled through the system by a cabler (not shown) which essentially through the application of tension on one end of the cables (491), (493), (495), and (497) pulls the cables from their spools through the described apparatus. In the preferred embodiment, the cabler provides a twist or helix structure to the resultant multi-member cable. This twist is shown in FIG. 2B. This twist or helix allows for strain relief on the components and/or resulting multi-member composite cable. In alternative embodiments such a twist or helix is not necessary.

Depending on the type of adhesive element used, the multi-member cable may be fed into a solidifying apparatus after leaving the closing die (471). As would be understood by one of skill in the art, a common method for cooling extruded plastic is the use of a water trough (not shown) through which the warm plastic passes, the water cooling the plastic through surface contact. This type of cooling apparatus may be used to cool extruded plastic forming the adhesive element therein by having the multi-member cable pulled through such a cooling apparatus. The multi-member cable, once cool, can then be spooled or packaged.

Figure 5:
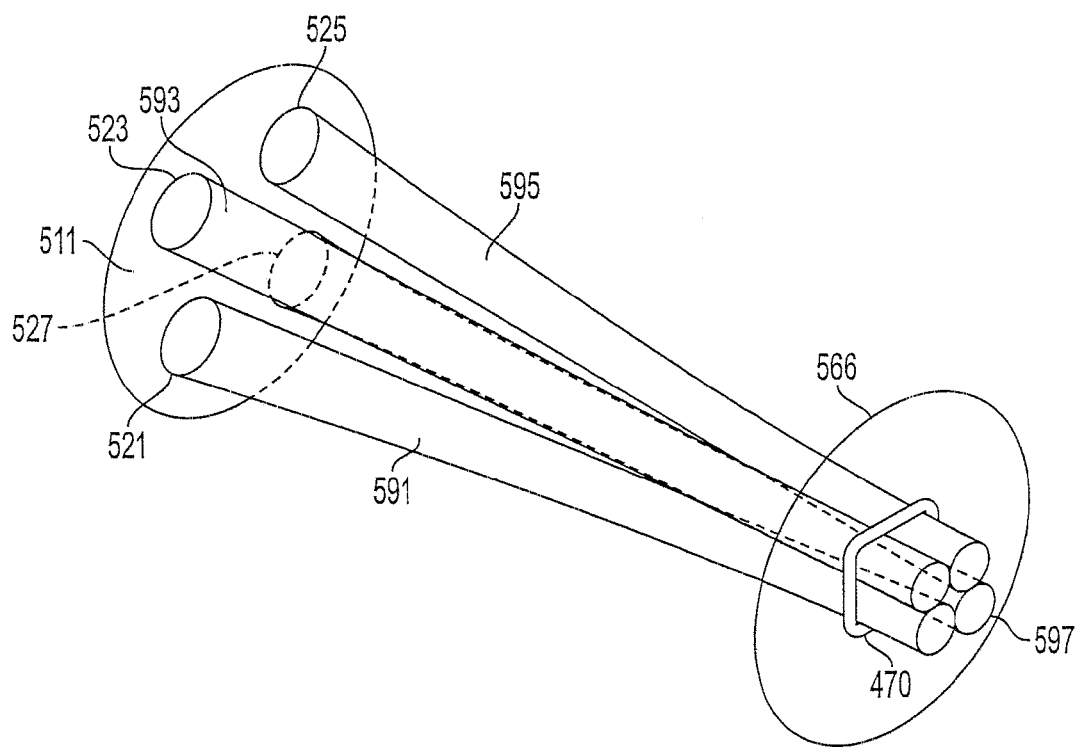
FIG. 5 provides an embodiment of a device for forming a multi-member cable such as that shown in FIG. 3.

FIG. 5 depicts another embodiment of some of the components of an assembly machine. Machine utilizing these structures would generally be used to manufacture a multi-member cable such as that shown in FIG. 3 where no separate adhesive element is used. As shown in FIG. 5, the individual cables are jacketed using the standard extrusion process as is known to those of ordinary skill in the art. However, in this case, the component cables (591), (593), (595), and (597) will generally not be cooled, completed, and spooled. Instead the four cables (591), (593), (595), and (597) will generally be simultaneously jacketed using a single extrusion die (511). This extrusion die (511) has multiple exit points (521), (523), (525), and (527) each of which provides for the construction of cables (591), (593), (595), and (597) to be produced simultaneously. Extrusion die (511) may also form non-cable components to be included in the resulting multi-member composite cable. The extruded cables (591), (593), (595), and (597) are then formed together as is shown and they pass through a forming device (566). This forming device (566) may generally be of similar construction to closing die (461) so that the cables are generally formed together. In this embodiment, however, the forming device (566) will generally include moving surfaces adjacent the opening (570) to prevent the jackets of cables (591), (593), (595) and (597) from sticking thereto as the jackets (which were extruded above) are generally still partially molten ("tacky"). The components are pushed together by forming device (566) such that the material of their jackets is placed in contact. As this material is still molten, it merges making the jackets co-form between the component cables. It is preferable that this be accomplished in a manner such that the forming device (566) does not distort the shape of the individual component cables (591), (593), (595), and/or (597). The placement and shape of the components of forming device (566) will determine the final shape of the resultant multi-member cable. As was discussed above, the multi-member cable can then be cooled using a water trough or other device (which now cools the jackets and adhering points), and, if desired, a cabler or other helix-forming method can introduce a twist to the resultant multi-member cable.

In an alternative embodiment, the extrusion die (511) can be replaced by multiple dies each of which produces a subset of cables that are later to be co-formed at a singular forming device. In still another embodiment, multiple forming devices, crossheads, and/or closing dies could be used in the manufacture of a single multi-member cable by manufacturing portions of the cable in series and/or in parallel.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A multi-member cable comprising:
   an adhesive element;
   a first component cable;
   a second component cable;
   a third component cable;

a fourth component cable; and a fifth component cable;

wherein said adhesive element is placed between said first component cable, said second component cable, said third component cable, said fourth component cable, and said fifth component cable and is in contact with said first component cable, said second component cable, said third component cable, said fourth component cable, and said fifth component cable such that said first component cable, said second component cable, said third component cable, said fourth component cable, and said fifth component cable are all adhered to said adhesive element;

wherein said component cables are twisted together; and wherein said first component cable, said second component cable, said third component cable, said fourth component cable, and said fifth component cable can be separated from said adhesive element without damage to any of said first component cable, second component cable, third component cable, said fourth component cable, and said fifth component cable.

2. The multi-member cable of claim 1 wherein said adhesive element comprises plastic.

3. The multi-member cable of claim 2 wherein said plastic comprises polyvinyl chloride (PVC).

4. The multi-member cable of claim 1 wherein said first component cable is adhered to said adhesive element with about three pounds of force.

5. The multi-member cable of claim 1 wherein said first component cable is adhered to said adhesive element with less than three pounds of force.

6. The multi-member cable of claim 1 wherein said component cables are twisted into helixes.

7. The multi-member cable of claim 1 wherein said first component cable is selected from the group consisting of: a voice or data cable, a coaxial cable, a low voltage power limited cable, a control cable, and an optical fiber cable.

8. A multi-member cable comprising:

an adhesive element;

at least five component cables;

wherein said adhesive element is placed between said at least five component cables and is in contact with said at least five component cables and said at least five component cables are all releasably adhered to said adhesive element; and wherein said at least five component cables are twisted together.

9. The multi-member cable of claim 8 wherein said adhesive element comprises plastic.

10. The multi-member cable of claim 8 wherein said at least five component cables are adhered to said adhesive element with about three pounds of force.

11. The multi-member cable of claim 8 wherein said at least five component cables are adhered to said adhesive element with less than three pounds of force.

12. The multi-member cable of claim 8 wherein at least one of said at least five component cables is selected from the group consisting of: a voice or data cable, a coaxial cable, a low voltage power limited cable, a control cable, and an optical fiber cable.

13. The multi-member cable of claim 8 wherein said at least five component cables are twisted into helixes.

* * * * *